No. 892,287. PATENTED JUNE 30, 1908.
J. C. MORSE.
RING EXPANDER FOR PISTON HEADS.
APPLICATION FILED SEPT. 6, 1907.

2 SHEETS—SHEET 1.

Witnesses
F. J. Veihmeyer
J. E. Burner

Inventor
John C. Morse
By Edson Bros.
Attorneys

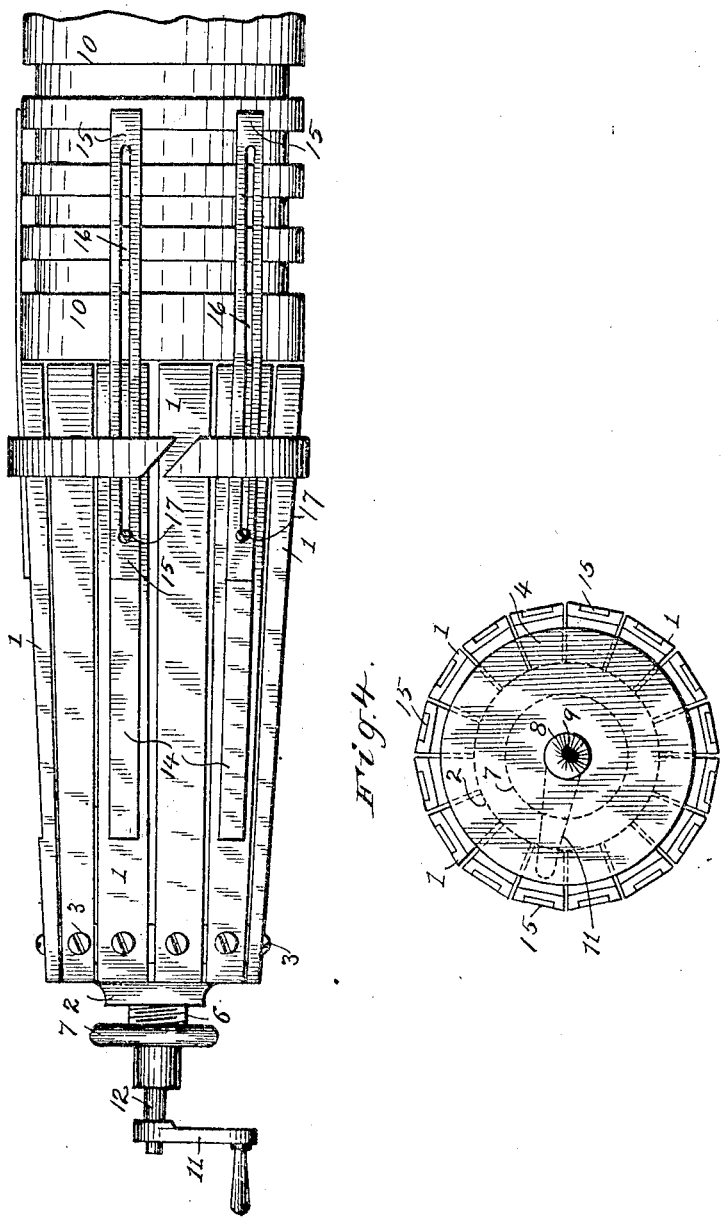

UNITED STATES PATENT OFFICE.

JOHN C. MORSE, OF NORTH BALTIMORE, OHIO.

RING-EXPANDER FOR PISTON-HEADS.

No. 892,287.   Specification of Letters Patent.   Patented June 30, 1908.

Application filed September 6, 1907. Serial No. 391,744.

*To all whom it may concern:*

Be it known that I, JOHN C. MORSE, a citizen of the United States, residing at North Baltimore, in the county of Wood and State of Ohio, have invented certain new and useful Improvements in Ring-Expanders for Piston-Heads; and I do hereby declare the following to be a full, clear, and exact description of the invention, such as will enable others skilled in the art to which it appertains to make and use the same.

This invention relates to improvements in ring expanders for piston heads, and can be applied in various ways where pistons are employed.

It further relates to the novel means for expanding piston rings through the medium of a traveling disk which is larger in diameter than one end of the device, consequently forming a conical approach for said disk. By this means the ribs are forced outwardly and at the same time expand the piston rings. This expansion is not limited as the piston rings can be expanded to any required diameter consistent with the strength of the material of which the piston rings are composed.

Figure 1:
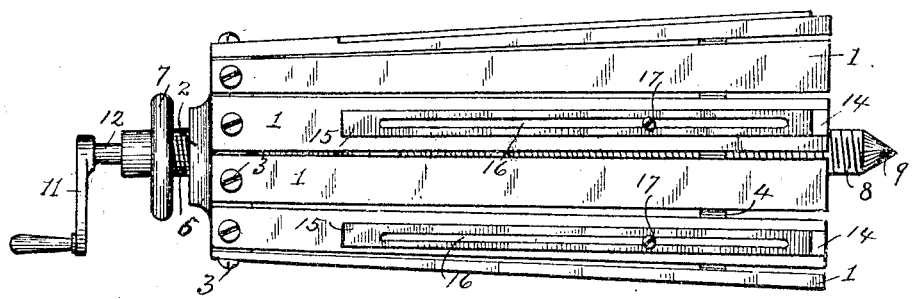
Figure 2:
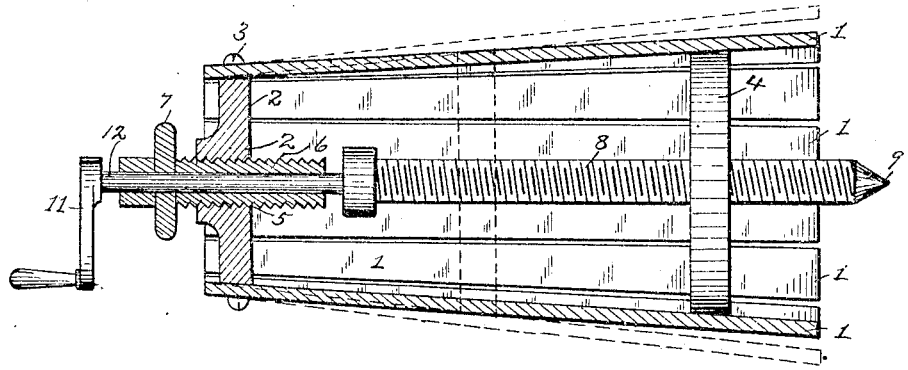

In the accompanying drawing Figure 1 represents an elevation of the improved ring expander. Fig. 2 is a central longitudinal section of the device. Fig. 3 is an elevation of the device, exhibiting a portion of a piston and one piston ring, and Fig. 4 is an end view of the device.

This device relates to a number of ribs 1 which are symmetrically arranged around an annular plate 2, and which are secured thereto by suitable screws or bolts 3. The face of said annular plate 2 is slightly conical or tapering so as to accommodate itself to the conical contour that said ribs 1 would assume when expanded by the traveling disk 4.

The annular plate 2 is of considerable thickness so as to allow of a screw thread 5 therein for accommodating a gage screw 6. This gage screw 6 is provided with a hand wheel 7 so as to force said gage screw inwardly or outwardly. Said gage screw 6 is designed to regulate the movement of the screw 8, so as to permit the point 9 to center in the end of the piston heads thus preventing slipping of the device when in operation. The screw 8 engages screw threads in said disk 4 whereby the piston rings can be expanded according to the size of the piston head 10. At the operating end of said screw 8, is a crank 11 or any other suitable device can be employed for rotating the screw 8. A portion of the metal forming the body or stock of said screw 8 is reduced in its diameter, as indicated at 12, so as to pass through the gage screw 6, and through the medium of its crank 11 and disk 4, the ribs 1 can be expanded to any extent desired for various sizes of piston heads.

The ribs 1 are recessed longitudinally at 14 so as to accommodate extension tongues 15. Said tongues are slotted at 16 almost their entire length and are provided with retaining screws 17 so that they can be adjusted on said ribs 1 for the purpose of slipping the first ring over the grooves in back end of the piston head, and may be raised or lowered by loosening screws 17 in slots 16.

When operating the device the extension tongues 15 are projected a suitable distance beyond the ribs 1, according to the number of piston rings that are intended to be placed upon a piston head, after which the piston rings are put upon said ribs and their accompanying extension tongues 15. In doing this care must be taken that the piston rings do not project beyond the ends of the ribs 1, until such time when the piston rings are all expanded through the medium of the mechanism previously described. Then the tongues 15 are forced over the piston head, as indicated in Fig. 3, and the piston rings being expanded spring into their annular recesses formed in said head.

I claim:

1. A ring expander which is provided with an annular plate, ribs secured to said plate, extension tongues mounted on said ribs in combination with means for expanding said ribs and extension tongues.

2. A ring expander which is provided with an annular plate, ribs secured to said plate, extension tongues mounted in recesses in said ribs in combination with means for expanding said ribs and extension tongues.

3. A ring expander consisting of an annular plate, ribs which are provided with extension tongues secured to said annular plate, a disk for expanding said ribs and extension tongues and a screw device for actuating said disk, and means for adjusting said screw device.

4. A ring expander consisting of an annular plate, ribs provided with extension tongues and secured to said plate, a disk for expanding said ribs and tongues, and a pointed screw for actuating said disk.

5. A ring expander consisting of an annular plate, ribs secured to said plate, a disk for expanding said ribs, an actuating screw for said disk having screw connection therewith, an adjusting screw for said actuating screw engaging with said annular plate and having a longitudinal passage therethrough, the shank of said actuating screw extending through said passage, and means on the end of said shank for turning said actuating screw.

6. A ring expander consisting of an annular plate, ribs provided with extension tongues and secured to said plate, a disk for expanding said ribs and tongues, a screw for actuating said disk and an adjusting screw for said actuating screw engaging with said annular plate and through which the shank of said actuating screw is passed.

In testimony whereof, I affix my signature, in presence of two witnesses.

JOHN C. MORSE.

Witnesses:
 C. E. WAY,
 E. C. MOORE.